(12) United States Patent
Thubert et al.

(10) Patent No.: US 8,976,672 B2
(45) Date of Patent: Mar. 10, 2015

(54) EFFICIENTLY DECOUPLING RESERVATION AND DATA FORWARDING OF DATA FLOWS IN A COMPUTER NETWORK

(75) Inventors: Pascal Thubert, La Colle sur Loop (FR); Eric Levy-Abegnoli, Valbonne (FR); Francois Le Faucheur, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 823 days.

(21) Appl. No.: 11/542,186

(22) Filed: Oct. 3, 2006

(65) Prior Publication Data
US 2008/0080473 A1 Apr. 3, 2008

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)
G06F 13/40 (2006.01)

(52) U.S. Cl.
CPC .................................. *G06F 13/4045* (2013.01)
USPC ........................................................ 370/238

(58) Field of Classification Search
USPC ........................................ 370/348, 229–238
See application file for complete search history.

(56) References Cited

U.S. PATENT DOCUMENTS

| | | | |
|---|---|---|---|
| 6,262,974 B1 * | 7/2001 | Chevalier et al. | 370/232 |
| 6,515,966 B1 * | 2/2003 | Bardalai et al. | 370/236 |
| 6,594,268 B1 * | 7/2003 | Aukia et al. | 370/400 |
| 6,628,610 B1 | 9/2003 | Waclawsky et al. | |
| 6,651,101 B1 | 11/2003 | Gai et al. | |
| 6,665,273 B1 | 12/2003 | Goguen et al. | |
| 6,721,272 B1 | 4/2004 | Parnafes et al. | |
| 6,876,668 B1 | 4/2005 | Chawla et al. | |
| 6,931,028 B1 | 8/2005 | Hock | |
| 6,973,315 B1 | 12/2005 | Miernik et al. | |
| 7,027,449 B2 * | 4/2006 | Garcia-Luna-Aceves et al. | 370/401 |
| 7,043,225 B1 | 5/2006 | Patel et al. | |
| 7,072,343 B1 | 7/2006 | Waclowsky et al. | |
| 7,116,682 B1 | 10/2006 | Waclawsky et al. | |
| 7,283,478 B2 * | 10/2007 | Barsheshet et al. | 370/238 |
| 7,558,199 B1 * | 7/2009 | Minei et al. | 370/230 |
| 2002/0083174 A1 * | 6/2002 | Hayashi et al. | 709/225 |
| 2003/0137978 A1 * | 7/2003 | Kanetake | 370/386 |
| 2004/0059858 A1 * | 3/2004 | Blankenship et al. | 710/305 |
| 2005/0018607 A1 * | 1/2005 | Frouin | 370/230 |

(Continued)

OTHER PUBLICATIONS

Moy, J., Network Working Group, Request for Comments 2328, entitled "OSPF Version 2", pp. 1-131, Apr. 1998.

(Continued)

*Primary Examiner* — Huy D Vu
*Assistant Examiner* — Adnan Baig
(74) *Attorney, Agent, or Firm* — Novak Druce Connolly Bove + Quigg LLP

(57) ABSTRACT

In one embodiment, a node (e.g., a router) performs reservations for data flows, each on a corresponding selected (reserved) path having adequate reservation availability. Also, the node forwards data from data flows, each over a corresponding selected (forwarded) path having adequate load availability, wherein forwarded paths are decoupled from reserved paths for the data flows.

25 Claims, 10 Drawing Sheets

(56) References Cited

U.S. PATENT DOCUMENTS

| | | | |
|---|---|---|---|
| 2005/0094652 | A1 | 5/2005 | Waclawsky et al. |
| 2005/0120213 | A1 | 6/2005 | Winget et al. |
| 2005/0135330 | A1* | 6/2005 | Smith et al. ............... 370/351 |
| 2005/0165834 | A1* | 7/2005 | Nadeau et al. ........... 707/103 R |
| 2005/0243723 | A1* | 11/2005 | Randriamasy ............. 370/235 |
| 2005/0271060 | A1* | 12/2005 | Kodialam et al. .......... 370/394 |
| 2006/0018326 | A1* | 1/2006 | Yucel ....................... 370/397 |
| 2006/0146696 | A1* | 7/2006 | Li et al. .................... 370/218 |
| 2006/0198308 | A1* | 9/2006 | Vasseur et al. ............ 370/238 |
| 2006/0268908 | A1* | 11/2006 | Wang et al. ............... 370/401 |
| 2007/0008882 | A1* | 1/2007 | Oran ........................ 370/229 |
| 2007/0091811 | A1* | 4/2007 | Thubert et al. ............ 370/238 |

OTHER PUBLICATIONS

Callon, R., Network Working Group, Request for Comments 1195, entitled "Use of OSI IS-IS for Routing in TCP/IP and Dual Environments", pp. 1-80, Dec. 1990.

Smit, H., Network Working Group, Request for Comments 3784, entitled "Intermediate System (IS-IS) Extensions for Traffic Engineering (TE)", pp. 1-13, Jun. 2004.

Katz, D., et al., Network Working Group, Request for Comments 3630, entitled "Traffic Engineering (TE) Extensions to OSPF Version 2", pp. 1-14, Sep. 2003.

Braden, R, et al., Network Working Group, Request for Comments 2205, entitled "Resource ReSerVation Protocol (RSVP)—Version 1 Functional Specification", pp. 1-105, Sep. 1997.

Perlman, R., Interconnections Second Edition: Bridges, Routers, Switches, and Internetworking Protocols, Section 1.1, Addison Wesley, pp. 1-7, 1999.

Perlman, R., Interconnections Second Edition: Bridges, Routers, Switches, and Internetworking Protocols, Section 12.2.4, Addison Wesley, pp. 317-319, 1999.

U.S. Appl. No. 11/255,966, entitled Forwarding Packets to a Directed Acyclic Graph Destination Using Link Selection Based on Received Link Metrics, on Oct. 24, 2005 by Thubert, et al.

* cited by examiner

EFFICIENTLY DECOUPLING RESERVATION AND DATA FORWARDING OF DATA FLOWS IN A COMPUTER NETWORK

BACKGROUND OF THE INVENTION

1. Field of the Invention

The present disclosure relates generally to computer networks and more particularly to efficiently decoupling reservation and data forwarding of a data flow in a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that are operated under different administrative domains. As used herein, an area or level, or more particularly, an AS, is generally referred to as a "domain," and a router that interconnects different domains together is generally referred to as a "border router."

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date routing information, the intermediate network node may cooperate with other intermediate nodes to disseminate routing information representative of the current network topology. For example, suppose the intermediate network node detects that one of its neighboring nodes (i.e., adjacent network nodes) becomes unavailable, e.g., due to a link failure or the neighboring node going "off-line," etc. In this situation, the intermediate network node can update the routing information stored in its routing table to ensure that data packets are not routed to the unavailable network node. Furthermore, the intermediate node also may communicate this change in network topology to the other intermediate network nodes so they, too, can update their local routing tables and bypass the unavailable node. In this manner, each of the intermediate network nodes becomes "aware" of the change in topology.

Typically, routing information is disseminated among the intermediate network nodes in accordance with a predetermined network communication protocol, such as a link-state protocol (e.g., IS-IS, or OSPF). Conventional link-state protocols use link-state advertisements or link-state packets (or "IGP advertisements") for exchanging routing information between interconnected intermediate network nodes (IGP nodes). As used herein, an IGP advertisement generally describes any message used by an IGP routing protocol for communicating routing information among interconnected IGP nodes, i.e., routers and switches. Operationally, a first IGP node may generate an IGP advertisement and "flood" (i.e., transmit) the packet over each of its network interfaces coupled to other IGP nodes. Thereafter, a second IGP node may receive the flooded IGP advertisement and update its routing table based on routing information contained in the received IGP advertisement. Next, the second IGP node may flood the received IGP advertisement over each of its network interfaces, except for the interface at which the IGP Advertisement was received. This flooding process may be repeated until each interconnected IGP node has received the IGP advertisement and updated its local routing table.

In practice, each IGP node typically generates and disseminates an IGP advertisement whose routing information includes a list of the intermediate node's neighboring network nodes and one or more "cost" values associated with each neighbor. As used herein, a cost value associated with a neighboring node is an arbitrary metric (a "link metric") used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc. Notably, as those skilled in the art will understand, Traffic Engineering (TE) extensions to IGP advertisements may be used to convey various link metrics, such as, e.g., link utilization, etc. Examples of TE extensions for IGP can be found in RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version* 2 dated September 2003, the contents of both of which are hereby incorporated by reference in their entirety.

As noted, IGP advertisements are usually flooded until each intermediate network IGP node has received an IGP advertisement from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes, i.e., thus computing a "shortest path tree" (SPT), as will be understood by those skilled in the art. For example, the Dijkstra algorithm is a conventional technique for performing such an SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the routing table and, in turn, the forwarding table(s) are updated to correlate destination nodes with next-hop interfaces associated with the lowest-cost paths to reach those nodes, as determined by the SPF calculation.

The data packets transferred among the network nodes may include fixed-sized data cells and/or variable-sized data frames. Each data packet typically comprises "pay-load" data prepended ("encapsulated") by at least one network header formatted in accordance with a network communication protocol. The network headers include information that enables the client nodes and intermediate nodes to route the packet efficiently through the computer network. Often, a packet's network headers include at least a datalink (layer 2) header and an internetwork (layer 3) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

In operation, a client node may send a data packet to a network interface of an intermediate network node. Thereafter, the intermediate network node receives the packet and forwards the packet to its next destination. For example, the intermediate network node may perform a layer-2 switching function that simply re-directs the packet from one network interface to another based on the contents of the packet's data-link header. Alternatively, the intermediate network node may perform a layer-3 routing function, or forwarding decision, that selects the most appropriate network interface to forward the packet based on the contents of the packet's internetwork header.

Data packets are used to transport many forms of information, including voice and video information, over networks and subnetworks. For instance, voice information may be transmitted in accordance with the Voice over Internet Protocol (VoIP). VoIP refers to a group of technologies used to transmit voice information over data networks from a source node to a destination node. The source and destination nodes employ voice agents that convert voice information from its traditional telephony form to a form that is suitable for packet transmission. In other words, the source node's voice agent encodes, compresses, and encapsulates the voice information into a plurality of data packets, and the destination node's voice agent performs complementary functions to de-encapsulate, uncompress, and decode the VoIP packets. Examples of voice agents include IP telephones, VoIP gateways, certain private branch exchanges (PBXs), personal computers (PCs) running communication applications, network devices providing voice gateway services, etc. Also, video information may be transmitted in accordance with Video on Demand (VoD) standards known to those skilled in the art in a similar manner. For instance, a VoD content server may supply video data streams to one or more "set-top-boxes" of users. Notably, the use of VoIP and VoD are examples of applications (e.g., at an application level) that a node within the network may operate. Those skilled in the art will understand that other applications may also be operated at network nodes.

A source node (sender) may be arranged to transfer a unidirectional stream of data packets, or a "data flow," to a destination node (receiver) in a data network. The data flow may comprise, for example, data or voice/video information. The data flow is unidirectional in that data travels one-way from the sender to the receiver. The logical procession of intermediate network nodes that transmit and receive data packets from the sender to the receiver defines the data flow's data path. A first node that is nearer the receiver in the data flow's data path than a second node in the flow is said to be "down-stream" from the second node. Likewise, a first node that is nearer the sender in the data flow's path than a second node in the flow is said to be "upstream" from the second node.

Some data flows are associated with a certain level of quality of service (QoS). For example, a data flow's QoS may specify minimum end-to-end latency or bandwidth requirements needed to support the flow. The Resource ReSerVation Protocol (RSVP) is a network-control protocol that enables source and destination nodes to "reserve" the necessary resources to establish the data flow in accordance with the flow's required QoS. RSVP works in conjunction with routing protocols to, e.g., reserve resources along a data flow between the source and destination nodes to establish a level of QoS required by the data flow. RSVP is defined in R. Braden, et al., *Resource ReSerVation Protocol (RSVP)*, Request For Comments (RFC) 2205, which is hereby incorporated by reference as though fully set forth herein.

In a typical arrangement, the sender sends an RSVP Path message identifying the flow (e.g., by identifying the sender address, the receiver address, source and destination port numbers, etc.), and indicating the bandwidth needed by the data flow. The Path message proceeds to the receiver following the flow's data path and each intermediate network node may update an optional "Adspec" object of the Path message. The Adspec object contains, inter alia, information about the characteristics of the network on the data flow path, such as available services, QoS, delay, and bandwidth estimates. Adspec objects may be generated by senders or by intermediate nodes, and are modified as they travel from one node to another. An Adspec object advertises the possible service parameters composed of the properties of all previous-hop nodes upstream. Namely, the arriving Adspec object is combined with the node's own parameters and service conditions, and then forwarded to the next node. A receiver can use the Adspec information to predict the end-to-end QoS, to choose the most appropriate service and to scale its QoS request according to the current possibilities of the network.

The receiver receives the Path message and may take into account contents of the optional Adspec object in the Path message to determine the specifics of the reservation requests it will generate for the flow. The receiver generates a "request for resources" in the form of an RSVP reservation request (Resv message) which travels hop-by-hop back to the sender. Within the Resv message is a "FlowSpec" object, which contains, inter alia, an indication of a peak expected traffic (e.g., bandwidth) from the sender (Tspec), and the requested traffic value to be reserved (Rspec). At each hop, the corresponding intermediate network node sets aside ("assigns") sufficient resources to provide the requested bandwidth for the desired data flow. These assigned resources are consequently made available to the data flow so that the data packets of the flow get appropriate QoS treatment (i.e., the data flow is "admitted").

If sufficient resources are not available, an intermediate network node may "reject" the Resv message (i.e., does not continue forwarding it), generate a reserve error (ResvErr) message, and forward the ResvErr message downstream towards the receiver. The ResvErr message travels downstream hop-by-hop and the receiver eventually receives the ResvErr message and concludes that the reservation has failed. A receiver whose Resv message has been rejected may attempt to acquire less resources by sending another Resv message requesting less bandwidth, or the receiver may re-attempt later to acquire the resources by re-transmitting another Resv message. Senders are unaffected by this process, and they continue to send Path messages to refresh their state. Notably, PathErr and ResvErr messages are typically sent and processed hop-by-hop by the intermediate nodes along the path between the sender and the receiver, as will be understood by those skilled in the art.

Notably, the reservation and data forwarding of the data flows are "coupled," in that they conventionally follow the same path. For instance, the path used for the forwarding of data flow data between the sender and the receiver is conventionally the current best path as selected by the routing protocols (e.g., IGP), such as the shortest (best) path of an SPF calculation. In that case, the path used to establish the reservation for the data flow is also the current best path as selected by the routing protocols. In the event the current path does not have sufficient resources for the data flow, the reservation is rejected, even if another (e.g., a non-shortest) path may have sufficient available resources. In essence, this practice is wasteful of available resources on non-best (non-shortest) paths, as available resources in the network remain unutilized. In particular, a data flow reservation may be unnecessarily rejected based on a fully reserved best path, while an acceptable non-best path may have available resources for the data flow. Also, it may often be the case that better (shorter) paths are fully reserved by variable rate data flows (i.e., reserved based on peak expected traffic), yet those variable rate data flows are not fully utilizing their reserved bandwidth. Other data flows may not be able to reserve bandwidth on the better (shorter) paths, even where those paths have sufficient unutilized (even though reserved) bandwidth.

One solution to allow IP routing to use non-shortest paths involves identifying a path with sufficient reservable resources, reserving that path, and programming states in each forwarding node along the path to ensure that data from the data flow will be forwarded along that reserved path. Notably, the path with sufficient reservable resources (e.g., bandwidth) need not be the shortest path, but may be a non-shortest path. Accordingly, per-flow states are necessary in order to forward the data (e.g., IP routed data) along non-shortest paths, where the per-flow states of each node along a path correlate the particular data flow and the appropriate next-hop node (e.g., not necessarily the next-hop node for the best/shortest path as determined and generally utilized by the routing protocols). These per-flow states, however, pose a scalability problem when large numbers of reservations are maintained at a node (e.g., a border router). Also, the reservation and forwarding of the data flows, though on non-shortest paths, remain coupled on the same path.

In addition, various mechanisms have been proposed to allow dynamic redistribution of data flows in a network using shortest and non-shortest paths based on current load, in order to avoid congestion that would otherwise exist if only the shortest paths were used. However, current reservation protocols would not operate properly in conjunction with these mechanisms, since the reservation protocols would always be trying to keep track of current best paths for all data flows based on the changing load, and attempting to reestablish the reservations along the best paths. Moreover, this dynamic redistribution would result in extraneous signaling and processing load.

There remains a need, therefore, for a technique that allows reservations to be placed on paths other than the current forwarding path, and for data associated with reserved data flows to be forwarded on paths other than the reserved path. In addition, there remains a need for this "decoupling" of the reservation and data forwarding of the data flow to be available without requiring per-flow states in the forwarding path, and without excess signaling and/or processing load.

SUMMARY OF THE INVENTION

The present disclosure is directed to a technique for efficiently decoupling reservation and data forwarding of a data flow in a computer network. According to the novel technique, a node (e.g., a router) performs reservations for data flows, each on a corresponding selected (reserved) path having adequate reservation availability. Also, the node forwards data from data flows, each over a corresponding selected (forwarded) path having adequate load availability, wherein forwarded paths are decoupled from reserved paths for the data flows.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
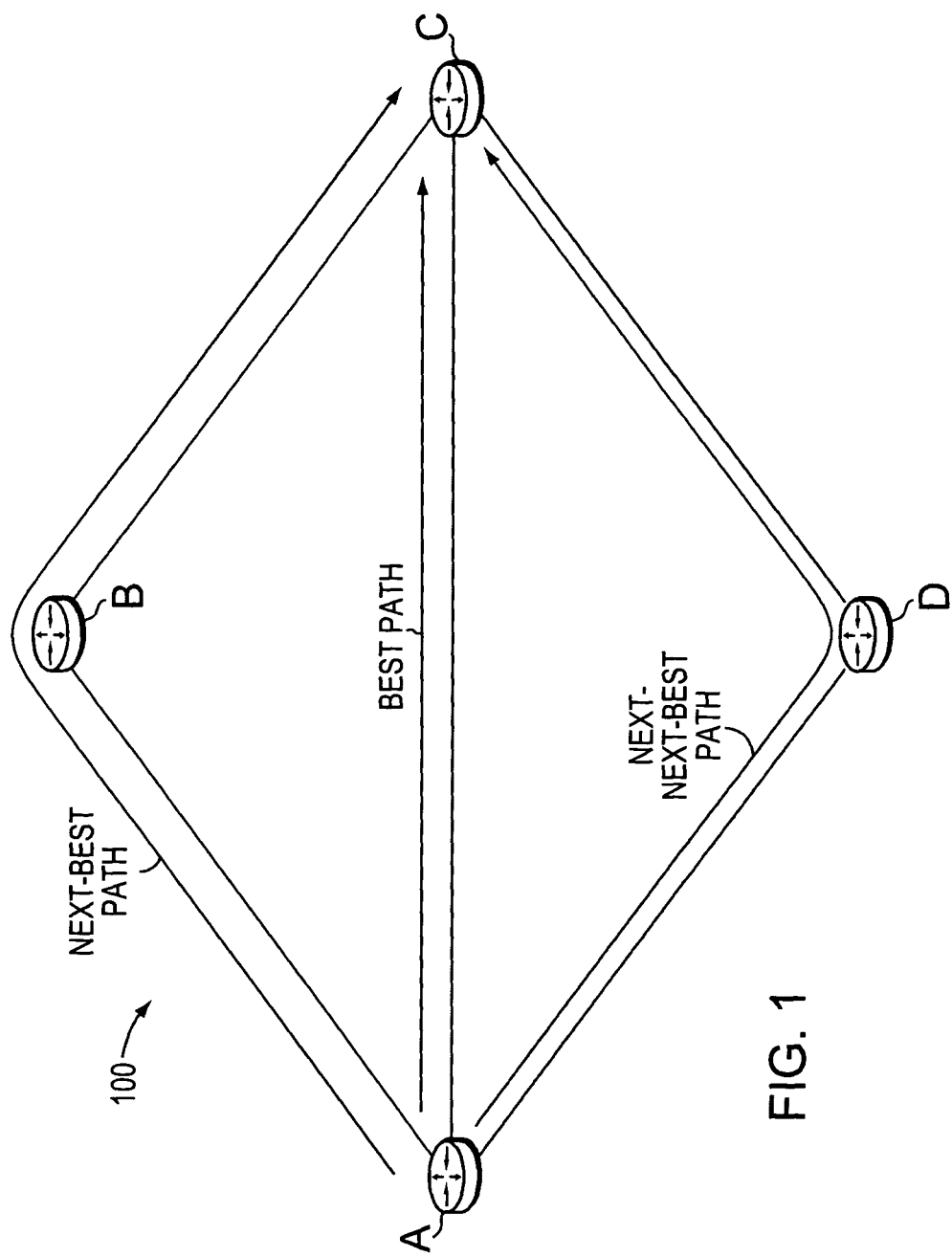
FIG. 1 is a schematic block diagram of an example computer network that may be used in accordance with the present invention.

FIG. 1 is a schematic block diagram of an example computer network 100 that may be advantageously used with the present invention. The network 100 comprises a plurality of interconnected network nodes, such as routers A-D (e.g., intra-domain routers) interconnected through links as shown. The links between the routers may have associated metric values (e.g., costs), and available bandwidth values, as described below, and may be established over wide area network (WAN) links, local area network (LAN) links, point-to-point links, wireless LAN links, etc., to form the network 100. Illustratively, network 100 may be contained within a single autonomous system (AS) or area, or may span multiple areas under certain circumstances as will be understood by those skilled in the art. An AS is herein defined to be a group of intermediate nodes, such as inter-domain and/or intradomain routers, within a network that are subject to a common authority and execute one or more inter-domain and/or intradomain routing protocols. For example, router A and router C may be "border routers" of the AS network 100 interconnected to one or more external ASes (not shown). Although the network 100 is illustratively shown within a single AS, those skilled in the art will appreciate that the network may alternatively be configured as routing domains or other networks or subnetworks. Notably, any number of nodes or routers may be used in the network 100, and that any number of links may be contained within the network 100 interconnected in various other configurations. These examples are merely representative, and the view shown herein is for simplicity.

Data packets may be exchanged among the nodes (routers) of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers of the computer network using predetermined Interior Gateway Protocols (IGPs), such as conventional distance-vector protocols or link-state protocols, through the use of IGP Advertisements, as will be understood by those skilled in the art.

Figure 2:
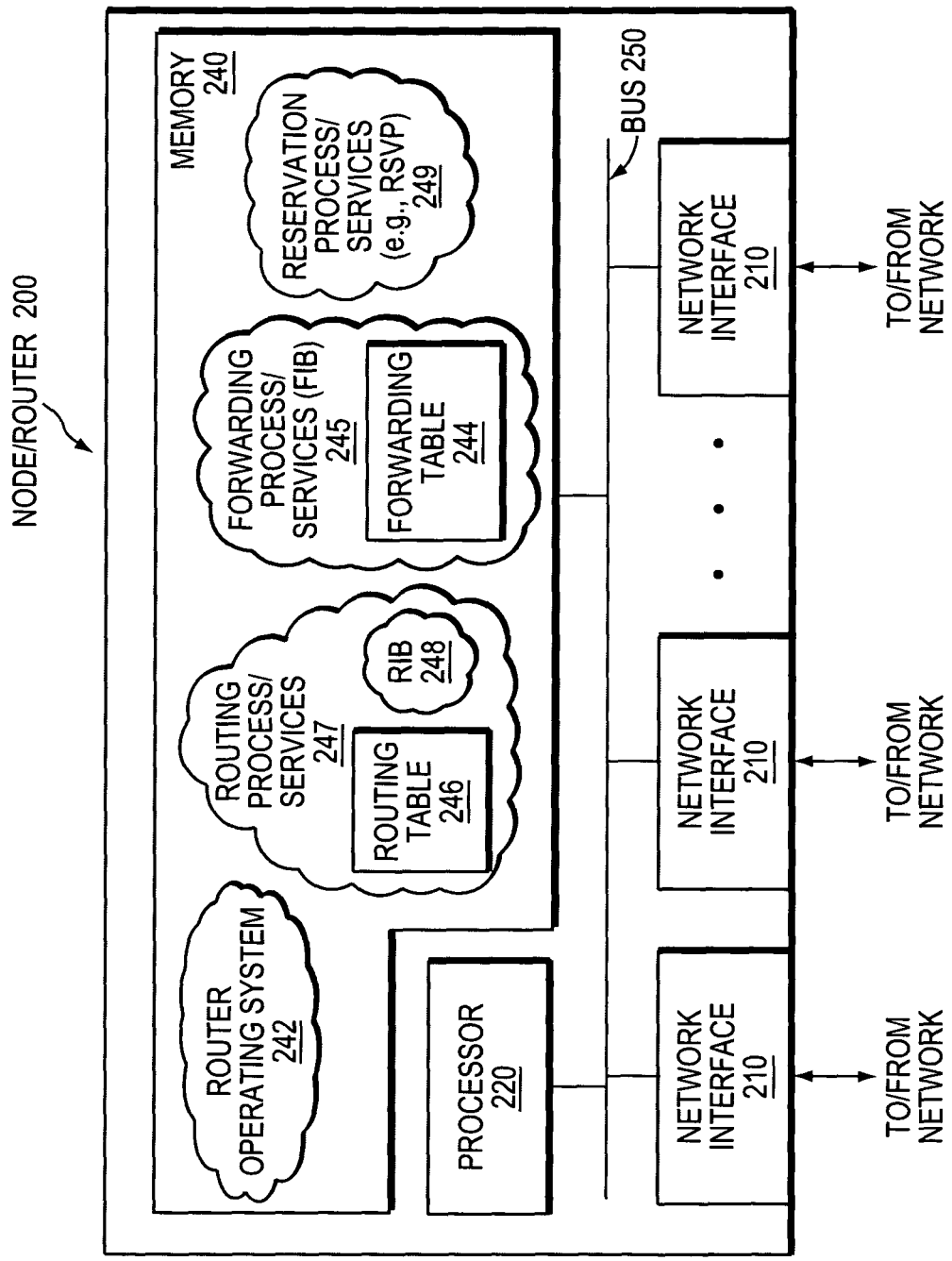
FIG. 2 is schematic block diagram of an example node/router that may be advantageously used with the present invention.

FIG. 2 is a schematic block diagram of an example node, e.g., router 200, that may be advantageously used with the present invention. The router may comprise a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 may comprise a plurality of storage locations that are addressable by the processor 220 and the network interfaces 210 for storing software programs and data structures associated with the present invention. The processor 220 may comprise necessary elements or logic adapted to execute the software programs and manipulate the data structures, such as forwarding table 244 and routing table 246. A router operating system 242 (e.g., the Internetworking Operating System, or IOS™, of Cisco Systems, Inc.), portions of which typically resident in memory 240 and executed by the processor, functionally organizes the router by, inter alia, invoking network operations in support of software processes and/or services executing on the router. These software processes and/or services may comprise forwarding process/services (e.g., Forwarding Information Base, FIB) 245, routing process/services 247, Routing Information Base (RIB) 248, and reservation process/services (e.g., Resource ReSerVation Protocol, RSVP services) 249. It will be apparent to those skilled in the art that other processor and memory means, including various computer-readable media, may be used to store and execute program instructions pertaining to the inventive technique described herein.

Routing process/services 247 may contain computer executable instructions executed by processor 220 to perform functions provided by one or more routing protocols, such as IGP (e.g., OSPF and IS-IS), BGP, etc. These functions may be configured to manage a routing table 246 containing, e.g., data used to make routing decisions, which may be managed by the RIB 248. Routing services 247 may also perform functions related to virtual routing protocols, such as maintaining VRF instances (not shown) as will be understood by those skilled in the art.

Forwarding process/services 245 may contain computer executable instructions executed by processor 220 to perform forwarding functions on data provided by routing services 247 and routing table 246, as will be understood by those skilled in the art. For instance, based on the connectivity of network interfaces 210, these forwarding functions may be configured to manage a forwarding table 244 containing, e.g., data used to make forwarding decisions.

Reservation process/services 249 may contain computer executable instructions for implementing reservation protocols, e.g., RSVP, and processing reservation (RSVP) messages in accordance with the present invention. RSVP is described in RFC 2205, entitled *Resource ReSerVation Protocol (RSVP)*, as incorporated above.

In accordance with RSVP, to request a reservation for a data flow between a sender (e.g., source router A) and a receiver (e.g., destination router C), the sender may send an RSVP path request (Path) message downstream to the receiver along a path (e.g., a unicast route) to identify the sender and indicate, e.g., bandwidth needed to accommodate the data flow, along with other attributes of the reservation. The Path message may contain various information about the data flow including, e.g., traffic characteristics of the data flow. Also in accordance with the RSVP, a receiver establishes the reserved path between the sender and receiver by responding to the sender's Path message with a reservation request (Resv) message. The reservation request message travels upstream hop-by-hop along the flow from the receiver to the sender. The reservation request message contains information that is used by intermediate nodes along the flow to reserve resources for the data flow between the sender and the receiver, to confirm the attributes of the reservation, and, for example, to provide a label (in label-switched networks). If an intermediate node in the path between the sender and receiver acquires a Path message or Resv message for a new or established reservation and encounters an error (e.g., insufficient resources, failed network element, etc.), the intermediate node generates and forwards a path or reservation error (PathErr or ResvErr, hereinafter Error) message to the sender or receiver, respectively. Those skilled in the art will understand that RSVP is merely an example, and that other reservation protocols may be used by reservation process 249 in accordance with the present invention.

Notably, as mentioned above, conventional reservation techniques dictate that the data flow be forwarded over the reserved path (i.e., the reservation and data forwarding of the data flow are "coupled"). In particular, in the event the path used to forward data is not reservable for the data flow (e.g., insufficient bandwidth), then the reservation will fail (unless, as mentioned above, non-shortest couple path techniques, e.g., stateful techniques, are used). Also, in the event a better path may be used to forward data than a reserved path for the data flow, the better path will not be utilized for the data flow based on the reservation.

The present disclosure is directed to a technique for efficiently decoupling reservation and data forwarding of a data flow in a computer network. According to the novel technique, a node (e.g., a router) performs reservations for data flows, each on a corresponding selected (reserved) path having adequate reservation availability. For example, the node may perform a reservation over a best reservable path of a plurality of paths (e.g., based on one or more path metrics) having adequate reservation availability for the data flow (e.g., having a data flow bandwidth). Notably, the path on which the reservation is made may not be a shortest path, that is, unless the shortest path has sufficient reservable bandwidth to accommodate the reservation.

Also, the node forwards data from data flows, each over a corresponding selected (forwarded) path, e.g., having adequate load availability, wherein forwarded paths are decoupled from reserved paths for the data flows. Decoupling of the forwarded paths and reserved paths generally means that the forwarded path may be selected taking into account other information beyond the selected reserved paths such that a forwarded path may be different from a reserved path for a given data flow. For example, the node may occasionally determine a current load availability (e.g., unutilized bandwidth) for each of the paths. Upon receiving data from a data flow, the node may forward that data flow over a best path having adequate load availability for the data flow. Any remaining data flows may be forwarded in a similar manner, each forwarded over a best path for that data flow (i.e., having adequate load availability for that data flow). In this manner, forwarded data flows within the network may generally be forwarded over a path which is better (e.g., shorter) than or equal to the reserved path. (Notably, some data flows may be forwarded on paths worse/longer than their reserved paths, however the average of all forwarded data flows in a decoupled manner is advantageously better than following coupled reserved paths.) Illustratively, this distribution of data flow data may be performed using a hash-based mechanism (for example, as commonly used for Equal Cost Multi-Path load balancing, as will be understood by those skilled in the art).

Illustratively, the present invention may utilize a shortest path first (SPF) then other path (TOP) operation/technique, as described in commonly-owned copending U.S. application Ser. No. 11/255,966, entitled FORWARDING PACKETS TO A DIRECTED ACYCLIC GRAPH DESTINATION USING LINK SELECTION BASED ON RECEIVED LINK METRICS, filed by Thubert et al. on Oct. 24, 2005, the contents of which are hereby incorporated by reference in its entirety. As described therein, a directed acyclic graph (DAG) may be created based on one or more link/path metrics (cost, link utilization, reservation availability, etc.) to determine the possible acyclic (non-looping) paths available to reach a destination. In particular, this forwarding protocol may be considered to provide an SPF TOP calculation that may be used to determine a set of shortest and non-shortest paths, and to allow packets to be forwarded over the non-shortest paths. In this way, the routing protocols (i.e., through routing services 247) may determine the shortest path to reach a destination, e.g., using conventional SPF techniques, but the forwarding protocols (i.e., through forwarding services 245) may determine the shortest path as well as other paths that may be used in some circumstances (e.g., in the event the shortest path becomes saturated or otherwise unusable).

Briefly, SPF TOP may utilize probes issued by the destination (e.g., router C) and received by the source (e.g., the participating node, router A) over the destination's reverse DAG (i.e., in the direction from destination to source) to determine various characteristics. For example, the multiple paths of the DAG may have various conventional metrics associated therewith, such as a cost, as well as other extended metrics as used herein, such as load availability (an amount of data that may be sent over the path before fully utilizing the maximum bandwidth of the path, e.g., measured in kilobits per second, kb/s), reservation availability (an amount of bandwidth that may be reserved over the path before fully utilizing the maximum reservable bandwidth of the path, e.g., in kb/s), etc. The information contained in the probes is dynamically updated, such that newer probes may produce newer information regarding the metrics, thus maintaining a real-time image of the network for appropriate computations, e.g., as described herein.

Alternatively, various extensions to IGP messages may be used to convey the dynamic path information, as will be understood by those skilled in the art. For example, extensions may be applied to Router Capability TLVs or Link Attribute TLVs of an IS-IS LSP, or to OSPF Opaque LSAs, etc., that may be used to convey the desired information, such as link utilization, reservation availability, etc., as used herein. The information contained in the IGP messages may also be used to create DAGs accordingly, to be used in accordance with the present invention as described herein.

Referring again to FIG. 1, for example, the best path (A-C) and next-best paths (next best A-B-C, next-next-best A-D-C, etc.) from the source node (router A) to the destination node (router C) based on, e.g., cost, may be determined as shown, and as further described herein. Notably, the best path determined by the DAG is the same as that determined by conventional SPF techniques. One important difference, however, is that conventional SPF techniques produce a shortest path tree (SPT) to reach each destination, while the DAG produces the set of non-looping paths (shortest and other paths) to reach a particular destination. The extended metric information (reservation availability, load availability, etc.) may then be applied to the DAG of FIG. 1, such as in accordance with the present invention described herein.

Figure 3:
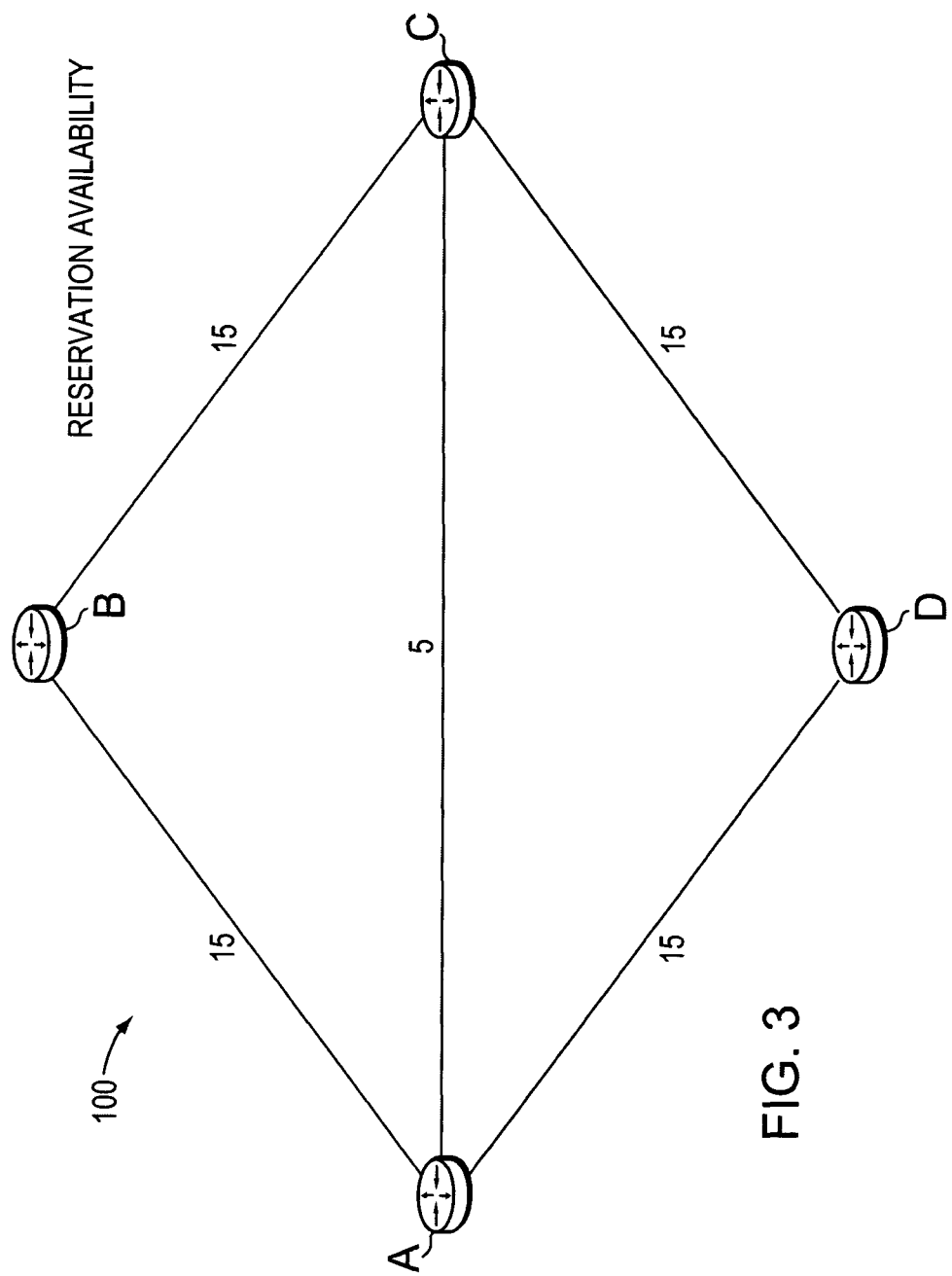
FIG. 3 is a schematic block diagram of an example reservation availability of links of the network shown in FIG. 1 in accordance with the present invention.

In accordance with an embodiment of the present invention, a participating node (e.g., router A) occasionally determines a reservation availability (e.g., remaining reservable bandwidth) of a plurality of paths to a destination node (e.g., router C). FIG. 3 is a schematic block diagram of an example reservation availability of links of the network 100 shown in FIG. 1 in accordance with the present invention. For instance, the number adjacent each link of the network 100 as shown represents an amount of reservation availability (e.g., in kb/s) in the direction from the source (router A) to the destination (router C). In other words, based on learned metrics from SPF TOP or from IGP advertisements containing the additional reservation availability information of the links in network 100, the participating node may determine the amount of bandwidth available for reservations along the multiple paths to the destination. Illustratively, then, the reservation availability of a path may be computed as the smallest reservation availability of any link along that path (e.g., a reservation availability of 15 kb/s along the next-best path of FIG. 1). Notably, the reservation availability may not correspond to the load availability of the links (described below). For example, this may occur if a data flow is currently transmitting at a rate lower than its reserved rate. Also, as those skilled in the art will understand, each link of the network 100 may or may not allow the entire available bandwidth of that link to be reserved. Accordingly, the reservation availability may not correspond to the maximum bandwidth of the links less any previously reserved amounts of bandwidth, but rather the maximum reservable bandwidth of the links less previously reserved bandwidth.

Figure 4:
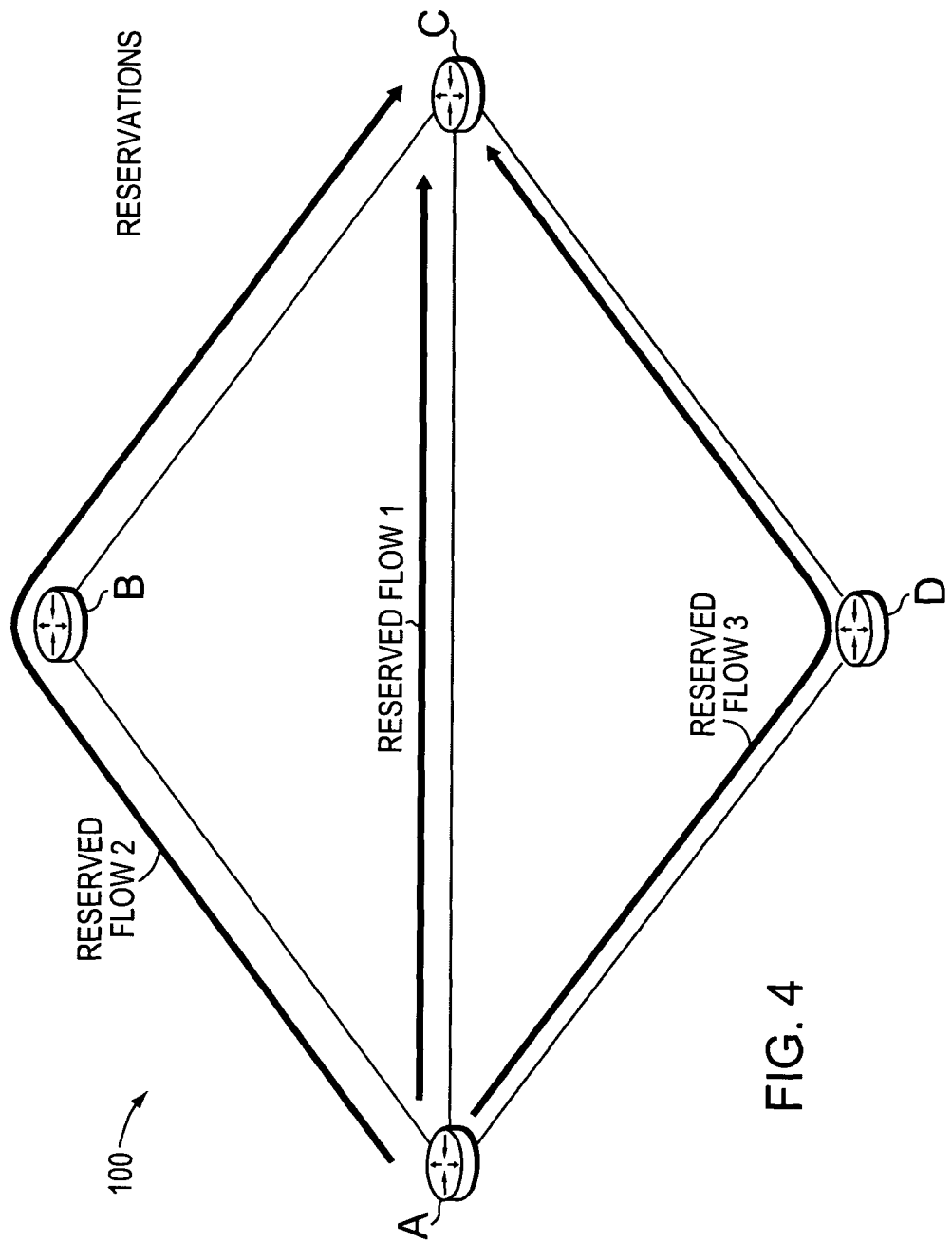
FIG. 4 is a schematic block diagram of an example reservation possibility for data flows in accordance with the present invention.

Based on the path metrics of the multiple paths to the destination node (router C) as well as the reservation availability of the paths, for example, based on the DAG and/or other learned metrics (e.g., through IGP messages), the participating node (e.g., router A) may determine a best path having adequate reservation availability for each data flow, i.e., the best reservable (selected) path. For instance, assume three illustrative 10 kb/s data flows (referred to generally as flow 1, 2, and 3) that either originate at router A, the participating node, or are received at router A (from nodes not shown) and are directed toward router C or past (to nodes also not shown). FIG. 4 is a schematic block diagram of an example reservation possibility for data flows in accordance with the present invention. For example, further assume that router A has already performed a reservation for flow 1 (shown as "Reserved Flow 1") along the best/shortest path A-C. (Notably, referring again to FIG. 3, the reservation availability shown for the network 100 may represent the network after the reservation of flow 1, i.e., as though the link A-C originally had 15 kb/s reservation availability.) As the participating node, router A, attempts to perform reservations for each subsequent flow, the updated DAG (e.g., as in FIG. 3 for flow 2) may be used to determine and select the best reservable path for each flow. For instance, the best reservable path may or may not be the shortest path to the destination generally (e.g., A-C), but rather may be the shortest path with adequate reservation availability (e.g., A-B-C for flow 2). Once the reservation for flow 2 has been performed, router A attempts to perform a reservation for flow 3, which may now only be along the next-next-best path (e.g., A-D-C) since each of the other available paths have less than the necessary reservability for the data flow. Note that while each flow has been shown reserved on a different path, if a single path has adequate reservability for multiple flows, those multiple flows may reserve the path (if desired). Note further that in the event adequate reservation availability does not exist on any path to the destination (e.g., a fourth 10 kb/s flow), the reservation will fail accordingly.

Notably, those skilled in the art will further understand that a constrained SPF (CSPF) operation operates in a similar manner. However, the DAG of the present invention is more versatile, and allows for a single best path to be determined to the destination (based on metrics), as well as other non-best paths to the destination, both in addition to the best "constrained" path to the destination (based on metrics and constraints). Moreover, in the event multiple paths exist to the destination with adequate reservation availability, the additional metrics (e.g., from SPF TOP and/or IGP extensions) may be used advantageously to select the better of the paths (e.g., equal metric paths) based on other metrics (e.g., utilization).

Again, by using the DAG as created by the reservation availability in FIG. 3, the participating node may forward the reservation requests to other nodes along the selected path (best reservable path). If each node along that path is configured to operate in accordance with the DAG in FIG. 3, the same path determined by the source node (router A) may generally be used by each intermediate node (router B and router D) on the way to the destination (router C). This way, no per-flow state is necessary at the nodes along the reservation path, since the path remains the best reservable path for the flow at each node according to the shared DAG. Notably, however, the reservation path used by each intermediate node need not be the same path as that determined by the source node, provided that alternative paths used by the intermediate nodes still meet the availability requirements for the data flow, and that the reservation may be appropriately established (e.g., proper Path and Resv message transmission).

Figure 5:
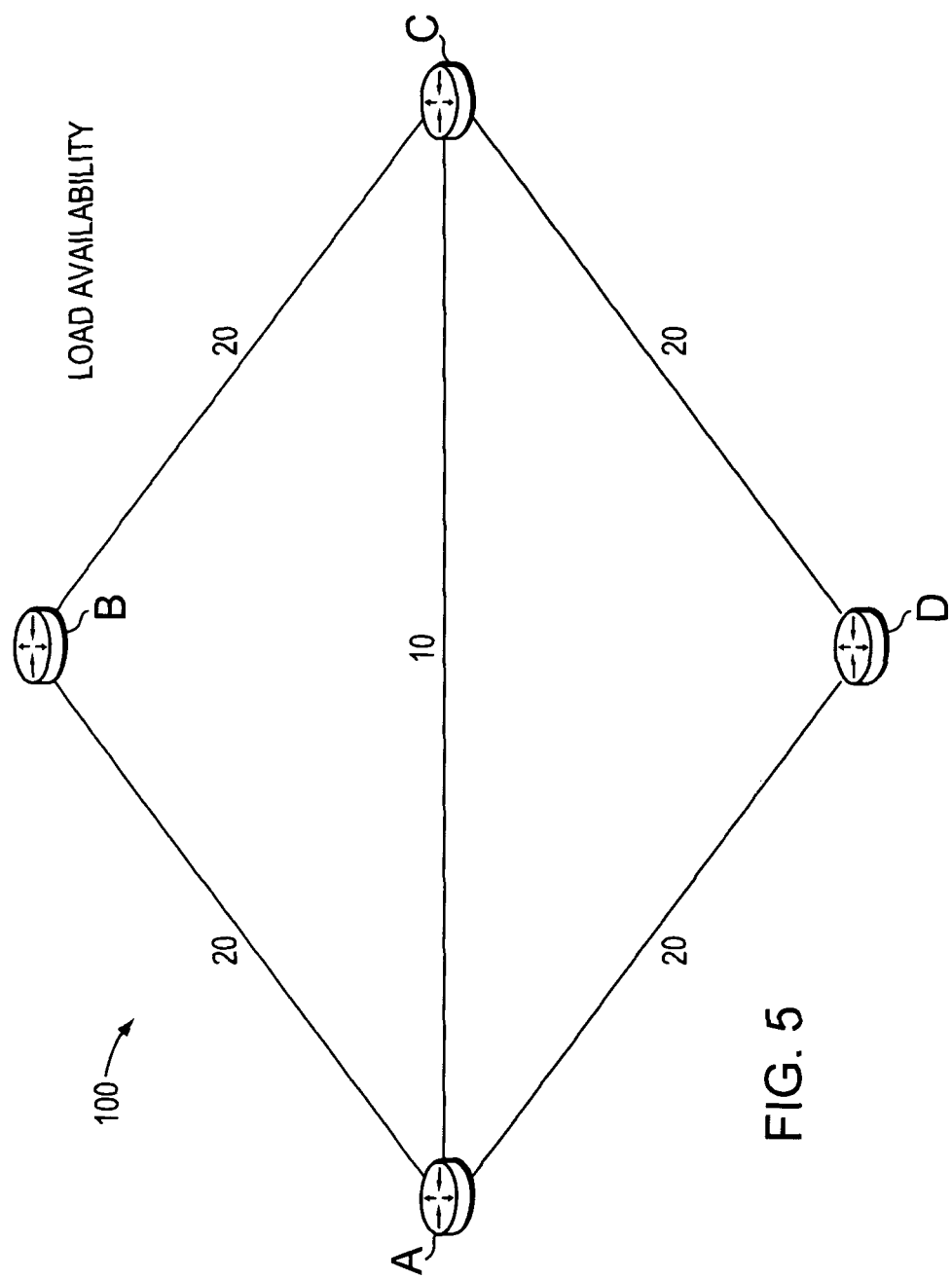
FIG. 5 is a schematic block diagram of an example load availability of links of the network shown in FIG. 1 in accordance with the present invention.

In accordance with an embodiment of the present invention, the participating node (e.g., router A) may also occasionally determine a current load availability (e.g., unutilized bandwidth) of the multiple paths to the destination (e.g., router C). For example, as used herein, assume that FIG. 5 is a schematic block diagram of an example load availability of links of the network 100 shown in FIG. 1 in accordance with the present invention. For instance, the number adjacent each link of the network 100 as shown represents is an amount of load availability (e.g., in kb/s) in the direction from the source (router A) to the destination (router C). As mentioned above regarding the creation of the reservation availability DAG, a load availability DAG may be created using SPF TOP, or through IGP advertisements containing the additional load availability information of the links in network 100. Illustratively, in a manner similar to the reservation availability above, the load availability of a path may be computed as the smallest load availability of any link along that path (e.g., a load availability of 20 kb/s along the next-best path of FIG. 1).

Figure 6:
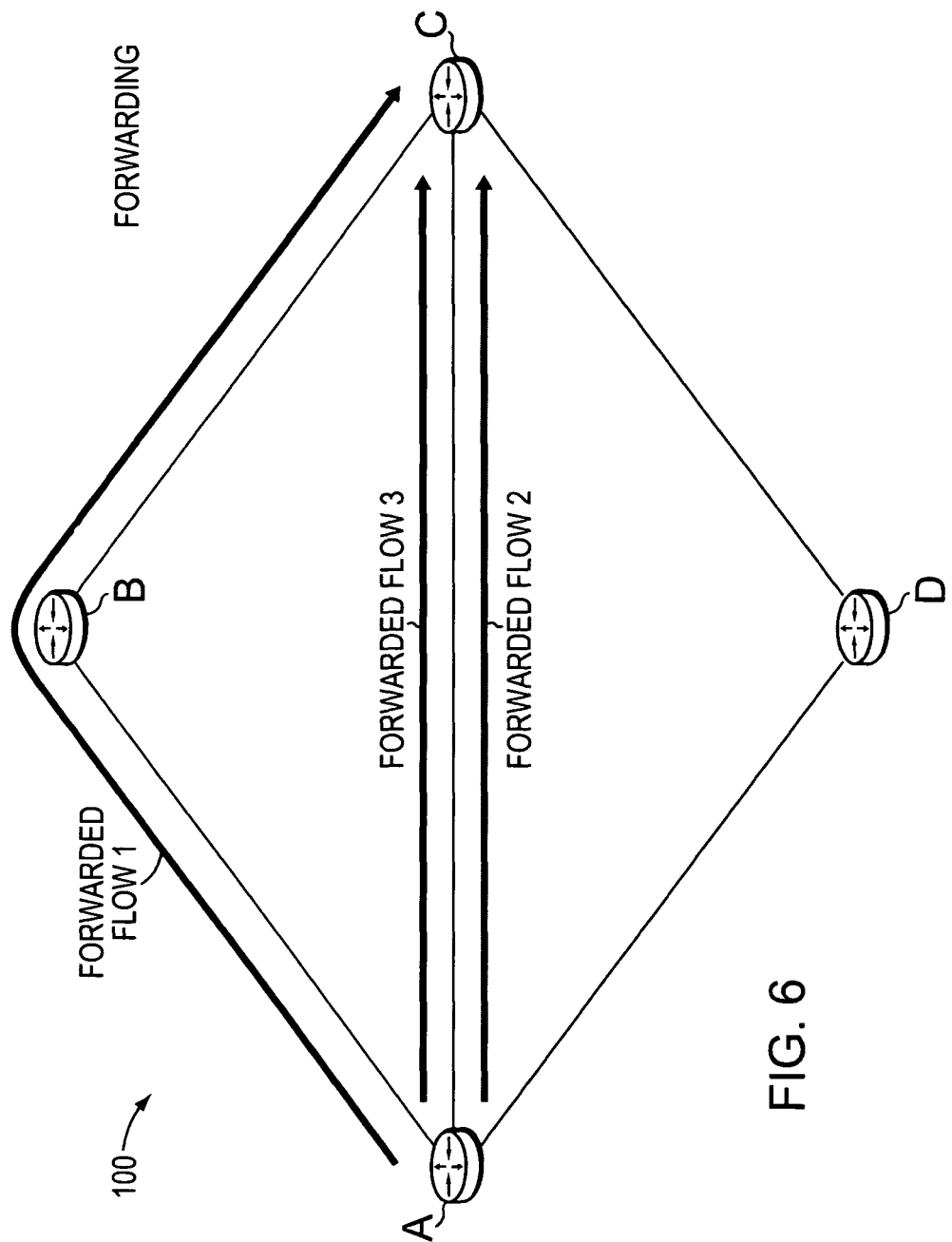
FIG. 6 is a schematic block diagram of an example forwarding possibility for the data flows as in FIG. 4 in accordance with the present invention.

Once the load availability DAG has been established, upon receiving data for the data flow, the participating node (e.g., router A) may forward each of the data flows over the paths based thereon (i.e., independently of the reserved path), for example, as described herein. To demonstrate the decoupling of data forwarding and reservation, FIG. 6 is a schematic block diagram of an example forwarding possibility for data flows as in FIG. 4 in accordance with the present invention, e.g., as based on the DAG determined in FIG. 5. For instance, referring to FIG. 4, it can be seen that the reserved path for flow 3 is the next-next-best path (A-D-C), as described above. However, assume now that after the reservations are complete (as in FIG. 4), the participating node selects forwarding paths in a reverse order (flow 3, 2, 1). By examining the load availability DAG of FIG. 5, the participating node may determine over which paths to forward the data flows accordingly. For example, further assume that each data flow 1, 2, and 3 utilizes approximately 5 kb/s of bandwidth (i.e., not the full 10 kb/s reserved). When selecting a path upon which to forward flow 3, the participating node, router A, determines that the shortest/best path (A-C) has adequate load availability for the data flow, and flow 3 (e.g., the first data flow to forward) is forwarded on that path accordingly (shown as "Forwarded Flow 3"). Similarly, when next selecting a path upon which to forward flow 2, the shortest path (A-C) still has adequate load availability for another 5 kb/s data flow, and hence may also forward flow 2 over that path.

Illustratively, flow 1, originally reserved on the best/shortest path, may now be forced to be forwarded on a next-best path (A-B-C) due to the independent placement/forwarding of the flows. (Notably, while a placement order has been illustratively used herein, the present invention is not so limited, and other factors within the scope of the present invention may cause a data flow to be forwarded on a path worse/longer or better/shorter than its reserved path). By forwarding the data flows in this manner, however, the present invention allows for dynamic flow balancing of the data flow onto one or more paths that on average are better than or equal to the reserved paths accordingly (e.g., flows 2 and 3 are on shorter paths, while flow 1 is not). As those skilled in the art will understand, the distributed forwarding of the data flows, notably decoupled from their reserved paths, distributes network utilization and reduces the overall metrics of the forwarded data flows, e.g., by using available paths with lower cost, lower delays, etc., for the data flows on average. Notably, the participating node may utilize hash-based forwarding techniques (as will be understood by those skilled in the art) to distribute the traffic over the distributed selected paths herein. Also, by forwarding the data flows based on the DAG created by SPF TOP operations, the participating node (e.g., forwarding process 245) does not need to maintain any states that identify each data flow over the distributed paths. For instance, the nodes along the path utilize the distribution technique in real-time for received data from the data flows, such that, e.g., as more data flows are received at the node, the node may dynamically place the received data flows over best paths with load availability.

Alternatively, the present invention may also utilize the other metrics and/or techniques on each path to the destination to determine over which path to forward the data flow. For example, because load availability may change frequently, the participating node may use thresholds to determine whether the change in load availability merits a change of data flow forwarding. Conversely, other metrics, such as amounts of reserved (or unreserved) bandwidth on each path, may be used to determine over which path to forward the data flows. Because the amount of reserved bandwidth changes less frequently, fewer changes to path selections may be made in response. However, the fewer changes may come at a sacrifice of utilizing less resources of the network (e.g., unutilized reserved resources). In many cases an applicable combination of metrics, such as basing the determination on a combination of load availability and reservation availability, may offer a beneficially dynamic balance between frequent and infrequent changes to the forwarding path of the data, and to utilize substantially more of the available network resources. Load availability as used herein, therefore, is merely one representative example of a determination metric, and other metrics may also be applied to the determination (yet still not forwarding on a path a data flow with more data than the load availability of the path, as will be understood by those skilled in the art).

Notably, the participating node of the present invention may be configured to utilize a given path only in the event the load availability is above a certain threshold, e.g., before or after the addition of a data flow to the path. For instance, a path having minimal load availability (e.g., 0.1 kb/s) may easily become over-saturated, and may cause delays, dropped packets, etc. if overloaded. Accordingly, it may be advantageous to only utilize paths having more than a certain amount of load availability (e.g., 0.5 kb/s) remaining after the addition of the data flow, and also to not utilize more than a certain amount of load availability for the same reason.

As perhaps a simpler example in summation, assume two paths from a source to a destination, e.g., paths "X" and "Y," each having a maximum bandwidth of 2 kb/s. Further assume that there are four data flows between the source and the destination, each data flow carrying 1 kb/s of data. As those skilled in the art will understand, to reserve these data flows, two data flows traverse path X, while two traverse path Y. In accordance with the present invention, while each data flow is transmitting at its peak reserved bandwidth, two data flows will be forwarded over path X and two data flows will be forwarded over path Y. On the other hand, in accordance with the present invention, assuming each of the four data flows only transmits at half of its peak bandwidth (i.e., 0.5 kb/s), then all of the data flows may be forwarded over the better of the two paths X and Y.

As a further example for illustrative summation, for a given data flow, the participating node performs reservation along a path and forwarding along a path, such that:

1) all packets of the given data flow are forwarded over the same path (at least until subsequent readjustment);
2) the selection of the forwarded path is made independently from the reserved path for that flow;
3) the load steered (forwarded/directed) onto a given path is less than or equal to the current load availability for that path;
4) data flows may be preferably forwarded on best available paths before next-best available paths; and
5) data flows may be forwarded based on all network traffic (load) on the links of the plurality of paths, e.g., including other data flows that do not share the plurality of paths, but share some subset of the links of the paths.

The present invention thus allows resource reservation (e.g., admission control) when dynamic flow distribution is used (e.g., SPF TOP) without significant signaling/processing load and without per-flow forwarding states. The present invention is particularly useful where a large number of reservations for data flows are established on multiple non-equal paths, and those reserved data flows are not currently utilizing their reserved capacity (e.g., variable rate streams). By taking advantage of the potentially reserved but unutilized resources (e.g., bandwidth), more data flows may be steered to (forwarded on) shorter paths than their corresponding reserved paths, resulting in better quality for these steered data flows and better overall network utilization (e.g., more capacity available for data flows). Also, the present invention is particularly advantageous when many data flows are forwarded to the same destination, such as, e.g., a reservation agent/proxy used at a boundary between networks. Further, the forwarding of the data flows during continued transmission is a dynamic process, such that as the load demands of the data flows fluctuate, the path selection/placement may be updated/adjusted accordingly, e.g., based on the particular data flows usage and/or based on the changing load availability of the network. However, once a reservation has been made for a data flow, the reservations need not (but may) be updated, since the actual forwarding of the data flow is independent of the reserved paths.

Notably, the present invention may also advantageously utilize multi-topology routing (MTR) to isolate reservation-based forwarded traffic from non-reservation based forwarded traffic. For example, a first topology "1" may be used for data flow traffic forwarded on reserved paths, while a second topology "2" may be used for data flow traffic not forwarded on reserved paths. This way, various routing techniques/mechanisms known to those skilled in the art may be applied separately to the reservation and non-reservation traffic, such as granting higher preference to reservation-based traffic, etc. Also, MTR may be used to separate classes of reservation-based traffic having different reservation constraints, as will be understood by those skilled in the art. For instance, different reservable resources may be available for different classes of data flow traffic, e.g., voice traffic, data traffic, etc. Accordingly, the calculations for available resources as described above may include the appropriate class distinction (e.g., resources available for voice, or resources available for data, etc.).

Figure 7:
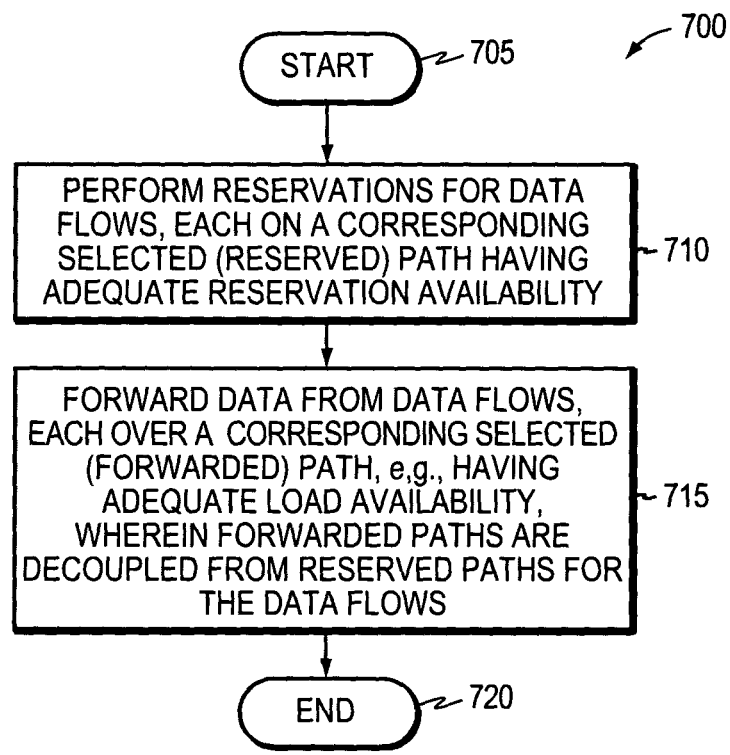
FIG. 7 is a flowchart illustrating an example procedure for efficiently decoupling reservation and data forwarding of a data flow in accordance with the present invention.

FIG. 7 is a flowchart illustrating an example procedure for efficiently decoupling reservation and data forwarding of a data flow in accordance with the present invention. The procedure 700 starts at step 705, and continues to step 710 where a node (e.g., router A) performs reservations for data flows, each on a corresponding selected (reserved) path having adequate reservation availability. Also, at step 715, the node forwards data from data flows, each over a corresponding selected (forwarded) path, e.g., having adequate load availability, wherein forwarded paths are decoupled from reserved paths for the data flows. The procedure 700 ends at step 720.

Figure 8:
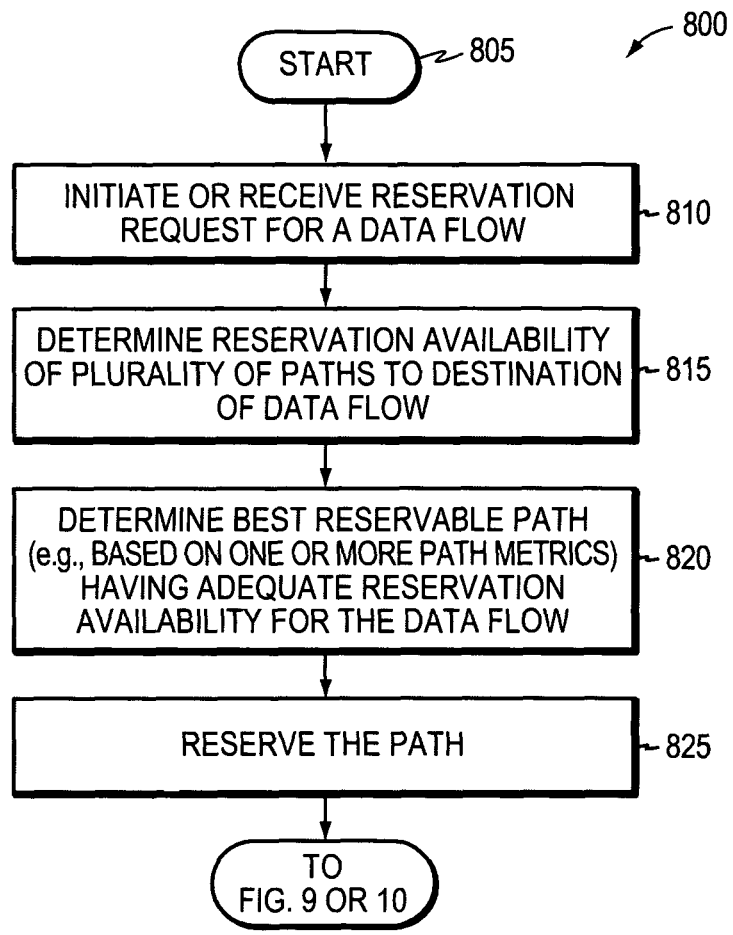
FIGS. 8-10 are flowcharts illustrating another example procedure for efficiently decoupling reservation and data forwarding of a data flow in accordance with the present invention.
Figure 9:
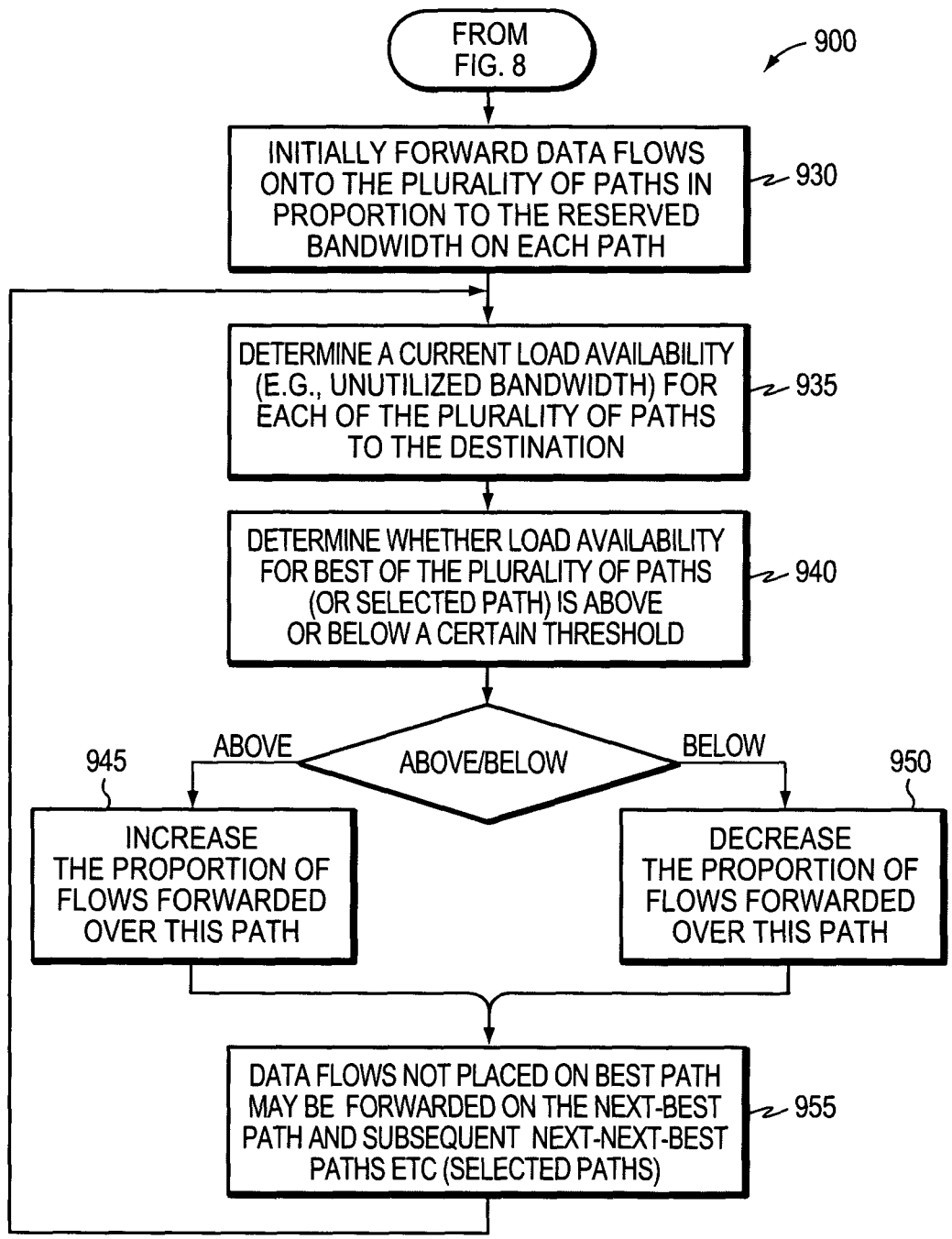
Figure 10:
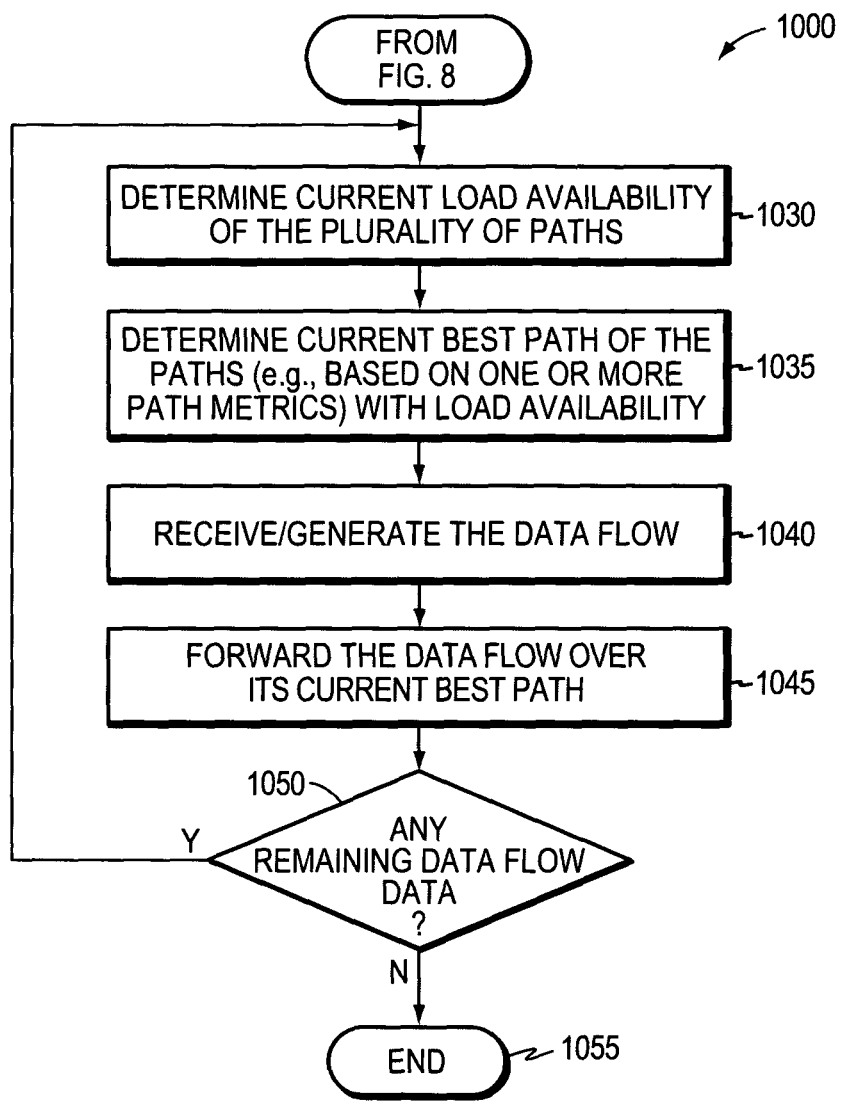

FIGS. 8-10 are flowcharts illustrating another example procedure for efficiently decoupling reservation and data forwarding of a data flow in accordance with the present invention. The procedure 800 starts in FIG. 8 at step 805, and continues to step 810, where a node initiates (as a source, e.g., router A) or receives (as an intermediate node, e.g., router B) a reservation request for a data flow, e.g., from router A to router C. In step 815, the node determines (or, notably, has determined) reservation availability of a plurality of paths to the destination of the data flow (e.g., router C). For instance, as described above, an SPF TOP mechanism may be used to determine the reservation availability (e.g., unreserved bandwidth) of each link/path accordingly. In step 820, the node further determines the best reservable path (e.g., based on one or more path metrics) that has adequate reservation availability for the data flow. For example, as illustrated above, the node may determine that a 10 kb/s data flow (e.g., flow 2 above) may not be able to utilize the current shortest path (e.g., based on an SPT TOP operation), but that another path (e.g., a non-shortest path, A-B-C) may have at least 10 kb/s of unreserved bandwidth. Once the best reservable path is selected in step 820 (the selected reserved path), the node may perform a reservation over the corresponding path (i.e., "reserves the path") in step 825.

Once the reservation of the data flow(s) is complete in FIG. 8, the procedure 800 may continue to procedure 900 with decoupled data forwarding in FIG. 9 at step 930, where the node initially forwards data flows onto the plurality of paths in proportion to the reserved bandwidth on each path. The node may then determine (or, notably, has determined) a current load availability (e.g., unutilized bandwidth) for each of the plurality of paths to the destination in step 935. If the load availability for the best of the plurality of paths is above a certain threshold at step 940, the node may increase the proportion of flows forwarded over this path in step 945. Conversely, if the load availability for the best of the plurality of paths is below a certain threshold in step 940, the node decreases the proportion of flows forwarded over this path in step 950. Any data flows that the node does not place on the best path may be forwarded on the next-best path and subsequent next-next-best paths etc. in the same manner (increased/decreased proportions), as shown by step 955. This "proportional" process continues on an ongoing basis with data flows being added to or removed from the best path, next-best path, next-next-best path, etc. to be placed on the best available path at the time the decision is made.

Alternatively or in addition, the procedure 800 may continue to procedure 1000 with decoupled data forwarding in FIG. 10 at step 1030, where the node determines (or, notably, has determined) a current load availability (e.g., unutilized bandwidth) for each of the plurality of paths to the destination. In step 1035, the node determines a current best path of the paths (e.g., based on one or more path metrics) with load availability for a particular data flow. In other words, the node determines the best path with sufficient available bandwidth (e.g., above a threshold, as described above) for a data flow, for example, A-C, independently of the reserved path for that data flow. Upon receiving/generating data from that data flow in step 1040, the node forwards that data flow over its current best path (the selected forwarded path) in step 1045. If at step 1050 there remains any data flow data not forwarded (e.g., from other data flows), the procedure 1000 returns to step 1030 to determine (or recalculate) the current load availability of the paths (i.e., based on the additional forwarded data from previous data flows). The procedure then continues to place the remaining data flow data on the best paths with load availability until the data flows are all placed in step 1050, in which case the procedure 1000 ends in step 1055. Notably, while not explicitly shown, the node may also repeatedly revisit the placement of the data flow data for each of the flows, such that the forwarded path for a given data flow may dynamically change in response to network and/or traffic changes.

Advantageously, the novel technique efficiently decouples reservation and data forwarding of a data flow in a computer network. By decoupling reservation and data forwarding of a data flow, the novel technique allows data flows to be admitted over non-shortest paths (when the shortest path does not have sufficient reservable bandwidth) and allows some flows to be forwarded on a path that is shorter than the path on which the corresponding reservation was established, e.g., where there currently remains some reserved but currently unutilized bandwidth on this shorter path. Also, the novel technique does not require a per-flow forwarding state at the node. Further, the dynamic aspects of the novel technique alleviate the need for cumbersome manual configuration.

While there has been shown and described an illustrative embodiment that efficiently decouples reservation and data forwarding of a data flow in a computer network, it is to be understood that various other adaptations and modifications may be made within the spirit and scope of the present invention. For example, the invention has been shown and described herein for use with RSVP as the reservation process protocol. However, the invention in its broader sense is not so limited, and may, in fact, be used with other reservation protocols, as will be understood by those skilled in the art. Also, while the above description describes utilizing SPF TOP for determining reservation availability, load availability, etc., those skilled in the art will understand that other techniques may also be used in accordance with the present invention. Further, while the present invention determines the best paths at each node of the paths (e.g., for forwarded data or for reservation signaling), such determinations may be made at a single node configured to inform the intermediate nodes of the determinations. For example, the source node (e.g., router A) or a separate node altogether (e.g., a Path Computation Element, PCE) may determine the best corresponding paths, and may inform the intermediate paths of the paths, e.g., using explicit route objects (EROs), etc., as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A node for efficiently decoupling reservation and data forwarding of data flows in a computer network, the node comprising: one or more network interfaces; a processor coupled to the one or more network interfaces and adapted to execute software processes; a memory adapted to store a reservation process executable by the processor, the reservation process configured to select a reserved path for a data flow that passes data from a source node to a destination node, and place a reservation for the data flow on the selected reserved path, the selected reserved path for the data flow to have adequate reservation availability for the data flow; and the memory further adapted to store a forwarding process executable by the processor, the forwarding process configured to select, based on a directed acyclic graph adapted for determining acyclic paths available to reach the destination node, a forwarded path other than the selected reserved path for the data flow for transferring data from the source node to the destination node, forward data for the data flow over the selected forwarded path while maintaining the reservation for the data flow upon the selected reserved path, determine whether a load availability for the selected forwarded path is above a threshold, and if so, increase a first proportion of data flows forwarded over the selected forwarded path and decrease a second proportion of data flows transmitted over the selected reserved path, the selected forwarded path being a non-shortest path between the source node and the destination node and having adequate load availability for the data flow, wherein selection of the selected forwarded path is decoupled from the selected reserved path for the data flow such that the selected forwarded path is selected independently from the selected reserved path.

2. The node as in claim 1, wherein the selected forwarded path for the data flow is not the selected reserved path for the data flow.

3. The node as in claim 1, wherein the selected forwarded path for the data flow is the selected reserved path for the data flow.

4. The node as in claim 1, wherein the selected forwarded path for the data flow is shorter than or equal to the selected reserved path for the data flow.

5. The node as in claim 1, wherein the reservation process is further configured to:
determine a reservation availability of paths to the destination node of the data flow through use of a Shortest Path First Then Other Path (SPF TOP) mechanism.

6. The node as in claim 1, wherein the forwarding process is further configured to:

determine load availability of paths and determine the selected forwarded path through use of a Shortest Path First Then Other Path (SPF TOP) mechanism.

7. The node as in claim 1, wherein the forwarding process is further configured to:
forward data flow data based on hash-based forwarding rules.

8. The node as in claim 1, wherein the selected forwarded path for the data flow is a best path having adequate load availability based on one or more metrics.

9. The node as in claim 1, wherein the selected reserved path for the data flow is a best path having adequate reservation availability based on one or more metrics.

10. The node as in claim 1, wherein the forwarding process is further configured to:
determine whether the load availability for the selected forwarded path is below a threshold; and
if so, decrease a first proportion of data flows forwarded over the selected forwarded path and decrease a second proportion of data flows transmitted over the selected reserved path.

11. The node as in claim 1, wherein the reservation process is further configured to:
inform one or more intermediate nodes of the selected reserved path for the data flow.

12. The node as in claim 1, wherein the node is an intermediate node of the reservation.

13. The node as in claim 1, wherein the forwarding process is further configured to:
utilize multi-topology routing (MTR) to distinguish between data flow data on the selected reserved path and data flow data not on the selected reserved path.

14. A method comprising: selecting a reserved path for a data flow that pass data from a source node to a destination node; placing a reservation for the data flow on a selected reserved path, the selected reserved path for the data flow being a path that has adequate reservation availability for the data flow; selecting, based on a directed acyclic graph adapted for determining acyclic paths available to reach the destination node, a forwarded path for the data flow for transferring data from the source node to the destination node, wherein the forwarded path is a non-shortest path between the source node and the destination node; forwarding data for the data flow over the selected forwarded path while maintaining the reservation for the data flow upon the selected reserved path; the selected forwarded path for the data flow being a path that has adequate load availability for the data flow, wherein selection of the selected forwarded path is decoupled from selection of the selected reserved path for the data flow such that the selected forwarded path is selected independently from the selected reserved path; determining whether a load availability for the selected forwarded path is above a threshold; and if so, increasing a first proportion of data flows forwarded over the selected forwarded path and decreasing a second proportion of data flows transmitted over the selected reserved path.

15. The method as in claim 14, wherein the selected forwarded path for the data flow is not the selected reserved path for the data flow.

16. A method comprising: requesting a reserved path for passing data of a data flow from a source node to a destination node; placing a reservation for the data flow to create the reserved path along a reservable path of a plurality of paths from the source node to the destination node that has reservation availability sufficient to accommodate the data flow, the reservable path being a path other than a shortest path between the source node and the destination node; subsequent to the reserving, determining a current load availability on the plurality of paths from the source node to the destination node, the plurality of paths including the shortest path between the source node and the destination node; selecting, based on a directed acyclic graph adapted for determining acyclic paths available to reach the destination node, one or more forwarded paths from the source node to the destination node from among the plurality of paths from the source node to the destination node based on the current load availability; the selected one or more forwarded paths being selected independently from the reserved path so that at least one of the one or more forwarded paths is not the reserved path, at least one of the one or more forwarded paths being the shortest path between the source node and the destination node; forwarding data of the data flow from the source node to the destination node over the selected one or more forwarded paths, while maintaining the reservation for the data flow upon the reserved path, wherein the reserved path is still operational when the forwarding occurs; determining whether a load availability for the selected forwarded path is above a threshold; and if so, increasing a first proportion of data flows forwarded over the selected forwarded path and decreasing a second proportion of data flows transmitted over the selected reserved path.

17. The method of claim 16, wherein the reservation availability sufficient to accommodate the data flow is reservable bandwidth sufficient to accommodate a bandwidth of the data flow, and wherein the current load availability is a current unutilized bandwidth.

18. The method of claim 16, wherein the one or more forwarded paths are a plurality of forwarded paths, and the forwarding forwards a portion of data of the data flow over each path of the selected plurality of forwarded paths.

19. The method of claim 18, wherein the forwarding attempts to place data of the data flow on a best available path of the plurality of forwarded paths as determined by one or more link or path metrics, while remaining data that is not placed on the best available path of the plurality of forwarded paths is placed on one or more next-best paths as determined by the one or more link or path metrics.

20. The method of claim 16, wherein the requesting further comprises:
sending one or more Resource ReSerVation Protocol (RSVP) messages.

21. An apparatus comprising: one or more network interfaces; a processor coupled to the one or more network interfaces and configured to execute software processes; and a memory configured to store a process executable by the processor, the process operable to request a reserved path for passing data of a data flow from a source node to a destination node, cause a reservation to be placed to create the reserved path along a reservable path of a plurality of paths from the source node to the destination node that has reservation availability sufficient to accommodate the data flow, the reservable path being a path other than a shortest path from the source node to the destination node, determine a current load availability on the plurality of paths from the source node to the destination node, the plurality of paths including the shortest path from the source node to the destination node, select, based on a directed acyclic graph adapted for determining acyclic paths available to reach the destination node, one or more forwarded paths other than the reserved path from the source node to the destination node from among the plurality of paths from the source node to the destination node based on the current load availability, the selected one or more forwarded paths being selected independently from the reserved path so that at least one of the one or more forwarded paths is not the reserved path and at least one of the one or more forwarded paths is the shortest path between the source node and the destination node, and forward data of the data flow from the source node to the destination node over the selected one or more forwarded paths, while the reservation for the data flow is maintained upon the reserved path and the reserved path is still operational, determine whether the load availability for the selected forwarded path is above a threshold; and if so, increase a first proportion of data flows forwarded over the selected forwarded path and decrease a second proportion of data flows transmitted over the selected reserved path.

22. The apparatus of claim 21, wherein the reservation availability sufficient to accommodate the data flow is reservable bandwidth sufficient to accommodate a bandwidth of the data flow, and wherein the current load availability is a current unutilized bandwidth.

23. The apparatus of claim 21, wherein the one or more forwarded paths are a plurality of forwarded paths, and the process is further operable to forward a portion of data of the data flow over each path of the selected plurality of forwarded paths.

24. The apparatus of claim 21, wherein the process is further operable to attempt to place data of the data flow on a best available path of the plurality of forwarded paths as determined by one or more link or path metrics, and place remaining data that can not be placed on the best available path of the plurality of forwarded paths on one or more next-best paths as determined by the one or more link or path metrics.

25. The apparatus of claim 21, wherein the reservation process is a Resource ReSerVation Protocol (RSVP) process.

* * * * *